United States Patent [19]
Neff et al.

[11] 3,827,723
[45] Aug. 6, 1974

[54] DOLLY FOR TRACTOR TRAILERS

[75] Inventors: Charles G. Neff, Saratoga, Calif.;
William F. Beebe, Holland, Mich.

[73] Assignee: Holland Hitch Company, Holland, Mich.

[22] Filed: Nov. 30, 1972

[21] Appl. No.: 310,892

[52] U.S. Cl. .......................... 280/476 R, 280/423 A
[51] Int. Cl. ............................................. B62d 53/02
[58] Field of Search ........ 280/405 A, 415 B, 423 A, 280/479

[56] References Cited
UNITED STATES PATENTS

| | | | |
|---|---|---|---|
| 3,312,479 | 4/1967 | Cunha | 280/415 B |
| 3,479,055 | 11/1969 | Cunha et al. | 280/415 B |
| 3,484,852 | 12/1969 | Norrie et al. | 280/476 R |
| 3,717,363 | 2/1973 | Berends | 280/476 R |

*Primary Examiner*—Leo Friaglia
*Assistant Examiner*—Randall A. Schrecengost
*Attorney, Agent, or Firm*—Price, Heneveld, Huizenga & Cooper

[57] ABSTRACT

A convertible dolly assembly having an elevatable fifth wheel and a specially locked, telescopically mounted drawbar. The dolly may be employed as a tandem axle on a tractor by lowering the fifth wheel, retracting the drawbar and fitting the drawbar and its supporting structure into a sleeve having locking means therein positioned at the rear of the tractor. Special cooperating locking means on the drawbar and the tractor include a rotatably engageable lock coupling on the end of the drawbar and a cooperable lock coupling in a sleeve mount on the tractor. For use as a towing dolly to pull a second trailer, the drawbar is rotated 90° thereby unlocking it and allowing it to be extended. Once extended, it is again rotated 90° to lock it in extended position. The fifth wheel can be locked in its raised position by a pair of special locking and support keepers slidably mounted on the frame.

14 Claims, 16 Drawing Figures

DOLLY FOR TRACTOR TRAILERS

BACKGROUND OF THE INVENTION

Dollies of various types for hauling additional trailers with a semi-truck are currently in use. Such convertible dollies are described for example in U.S. Patent application Ser. No. 95,457, filed on Dec. 7, 1970 entitled TRUCK TRACTOR CONVERTER DOLLY now U.S. Pat. No. 3,746,369 issued July 17, 1973 and also in U.S. Patent application Ser. No. 184,519, filed Sept. 28, 1971 entitled CONVERTER DOLLY TANDEM AXLE, now U.S. Pat. No. 3,717,363 issued Feb. 20, 1973 and assigned to the assignee of the present invention. The novel dolly assemblies disclosed in these applications are convertible for use as a second trailer hauling attachment or a tandem axle structure for use with the tractor. Although such units are very effective and useful, connection and disconnection can require the driver to work temporarily between the truck and the dolly. Also, it has sometimes been desirable to employ simpler arrangements for supporting the elevated fifth wheel thereon, for locking the drawbar in extended and retracted positions, and for locking the drawbar to the tractor when in retracted position for tandem axle use.

SUMMARY OF THE INVENTION

The dolly of the present invention provides a novel coupling arrangement for locking the dolly to the tractor in tandem axle relationship, a novel locking arrangement for locking the drawbar in either its extended or retracted positions, and a novel supporting and locking mechanism for holding the fifth wheel in its elevated position when used as a dolly to haul a second trailer. Further, the drawbar can be manipulated into locked and unlocked conditions from the rear of the dolly. Also, the apparatus is simple but effective.

A dolly embodying the present invention comprises an axle having a pair of wheels mounted thereon and a framework mounted to the axle. A fifth wheel assembly is fixed to the framework by a lift arm assembly. It can be elevated when used to tow a trailer, and lowered when used in tandem relation to a truck tractor. A sleeve centrally mounted in the dolly framework and extending along the length thereof includes a telescopically mounted drawbar having a lunette at the forward end. Special cooperating locking means located at the lunette end of the drawbar are adapted to mate with locking means internally located in a sleeve mounted on the rear of a truck tractor, to lock the dolly to the tractor. The locking mechanism can be coupled or uncoupled by a one quarter turn rotation of the drawbar with a specially mounted handle extendable from the opposite end of the drawbar at the rear of the dolly. Special segment locking means provided in the sleeve and drawbar lock the drawbar in either extended or retracted positions.

Other important objects and novel features of the present invention will become readily apparent to those skilled in the art upon reading the following description with reference to the accompanying drawings illustrating a preferred embodiment of the invention.

DETAILED DESCRIPTION OF THE PREFERRED EMBODIMENT

Figures 1, 10:
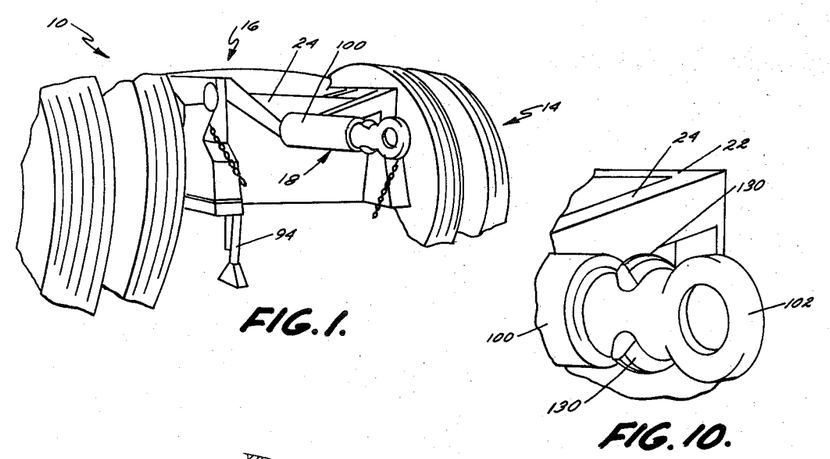
FIG. 1 is a perspective view of the novel dolly assembly with the telescopically mounted drawbar in its retracted position for coupling with a tractor, and having the fifth wheel lowered.
FIG. 10 is a perspective view of the locking member located at the lunette end of the drawbar for connection with the tractor mounted sleeve shown in FIG. 9.

Referring to FIG. 1, the novel dolly of the present invention indicated generally by the numeral 10, includes a frame subassembly 12, an axle assembly 14 supporting the frame on wheels, a fifth wheel assembly 16 and a telescopically mounted drawbar assembly 18.

Figure 2:
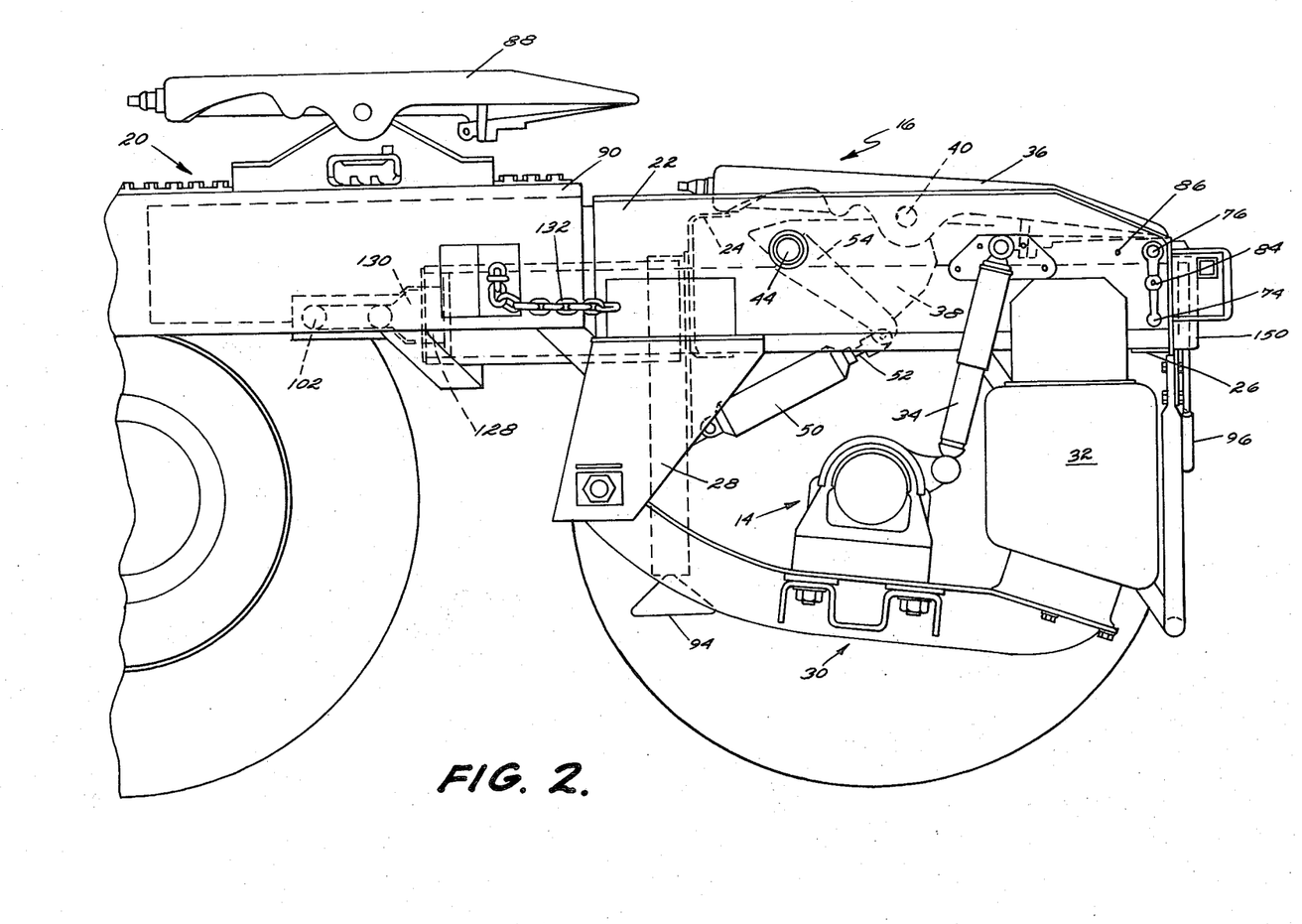
FIG. 2 is a side view of the dolly shown in FIG. 1 in tandem axle relation on a tractor and the drawbar rotated into a locked coupling position.
Figure 3:
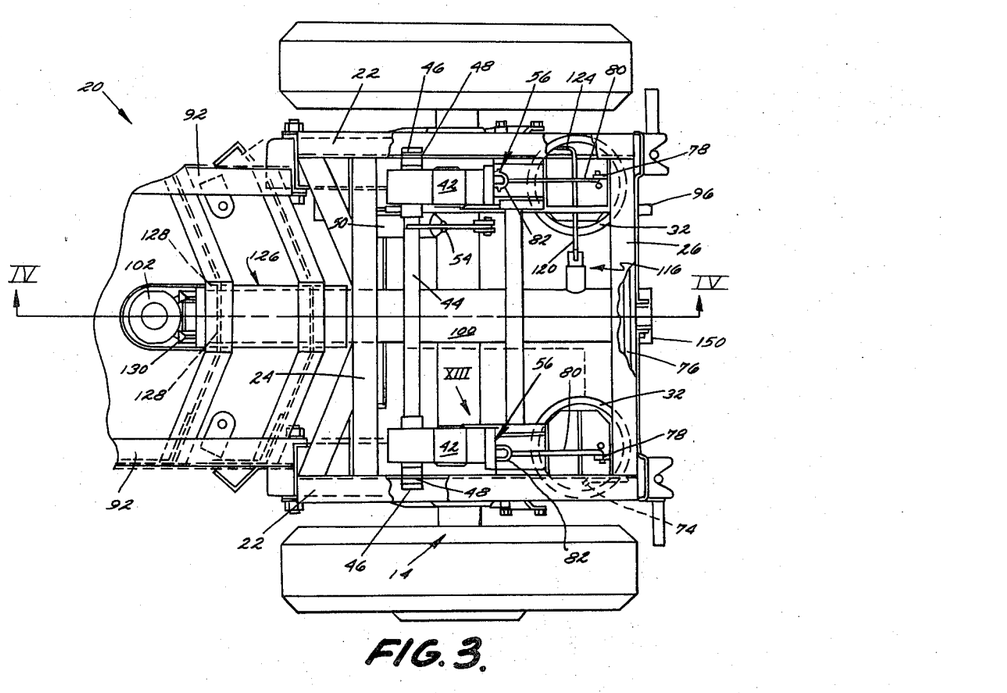
FIG. 3 is a plan view of the dolly illustrated in FIG. 2 with the fifth wheel removed for clarity.
Figure 4:
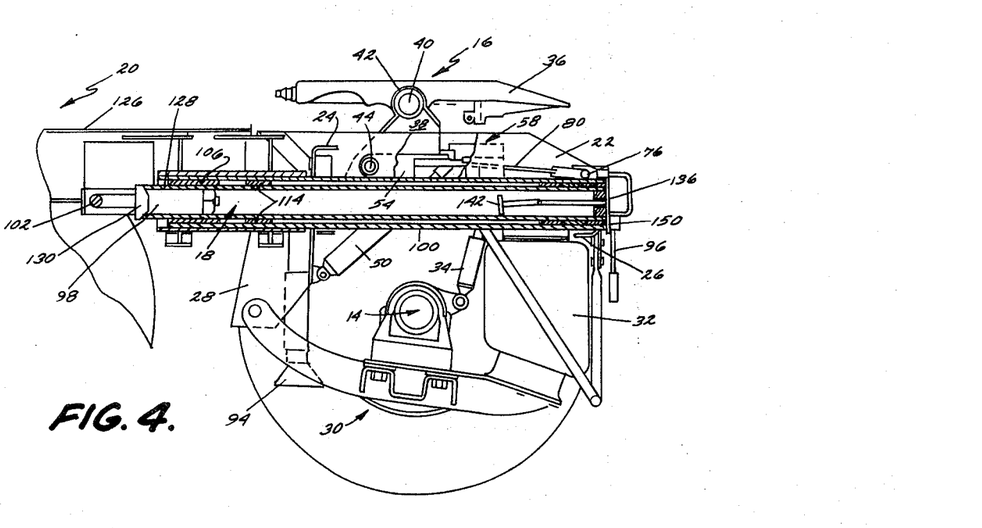
FIG. 4 is a cross-sectional view taken along plane IV—IV of FIG. 3 illustrating the internal construction of the drawbar, and with the fifth wheel raised to illustrate the locking mechanisms for the fifth wheel.
Figure 5:
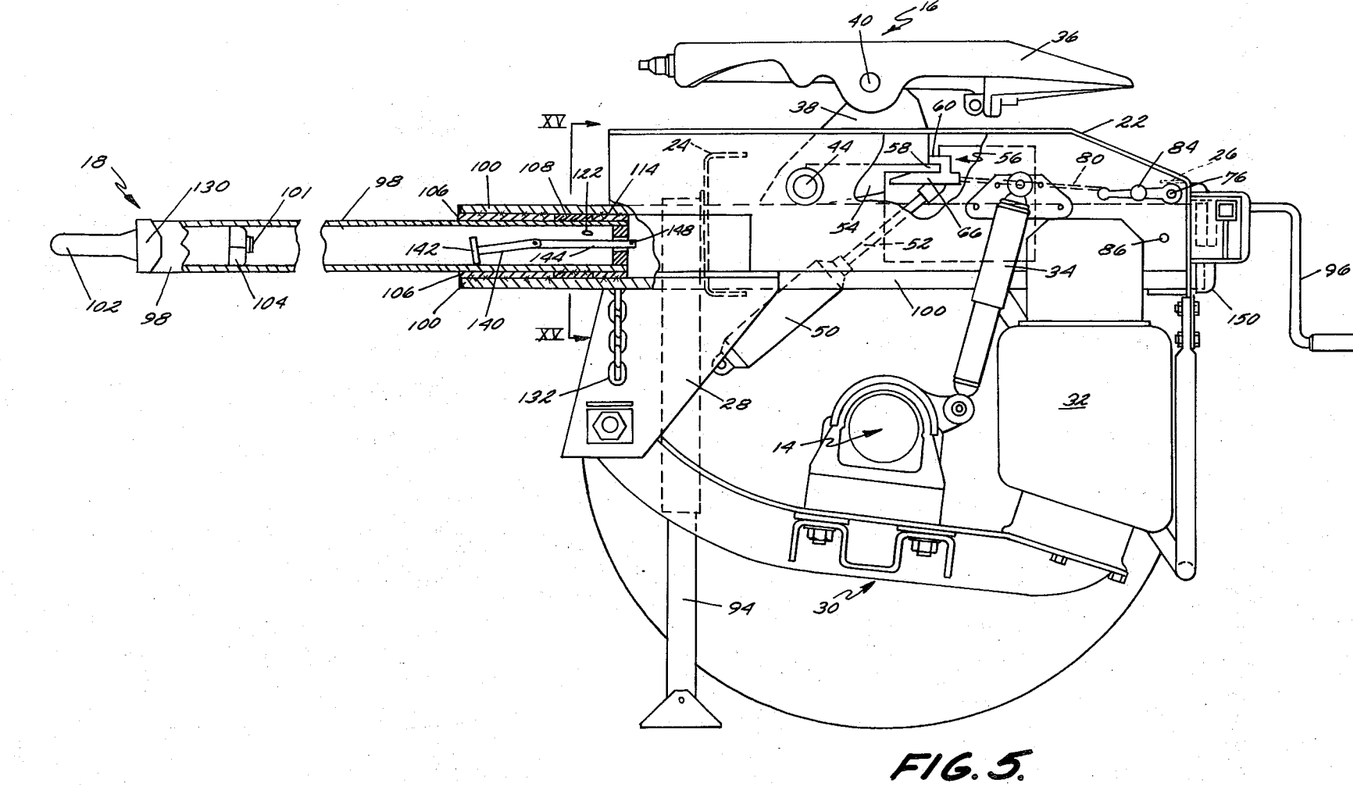
FIG. 5 is a cross-sectional view similar to FIG. 4 illustrating the dolly assembly with the drawbar extended and the fifth wheel raised for use as a trailer towing dolly.

The novel dolly assembly can be connected for use as a tandem axle with a truck tractor 20 as shown in FIGS. 2, 3 and 4 when the drawbar is retracted and the fifth wheel is lowered. With the fifth wheel raised and the drawbar extended, as shown in FIG. 5, it can be attached to the rear of a trailer and used to tow a second trailer.

As shown in FIGS. 2 through 5, the dolly frame assembly includes a pair of fore to aft channel frame members 22 generally Z shaped in cross section and secured together at the front and rear of the dolly by cross members 24 and 26 respectively. Downwardly depending support member 28 connected to the frame serves to couple axle subassembly 14 to the frame through a suspension system 30 including a pair of air springs 32. Conventional shock absorbers 34 are also mounted between the axle and the framework.

The fifth wheel assembly 16 includes a conventional fifth wheel 36 having a bifurcated tapered rear portion to receive the conventional coupling king pin on a trailer. The fifth wheel is mounted so that it can be raised as shown in FIGS. 4 and 5 or lowered as shown in FIGS. 1 and 2, by means of a pair of pivotally mounted lift arm bracket members 38. Bracket members 38 are pivotally attached to the fifth wheel by means of pins 40 passing through aligned flanges on the fifth wheel and sleeve bearings 42 (FIGS. 3 and 4) at the uppermost end of brackets 38. The lower ends of brackets 38 are fixed to a cross shaft 44. The cross shaft is rotatably mounted in frame members 22 with bushings 46 and is secured against lateral movement by locking collars 48 (FIG. 3) positioned on the ends of the shaft at the outside of frame members 22.

The fifth wheel is shiftable between raised and lowered positions by fluid actuator 50 secured at its lower end to support member 28. The opposite end of the actuator includes an extendable piston rod 52 pivotally connected to the outer end of a radial arm 54. The radially inner end of arm 54 is fixed to shaft 44 as by welding. Extension of piston rod 52 from fluid cylinder 50 raises the fifth wheel. The elevated fifth wheel can be locked into position by a pair of laterally spaced support and locking keepers 56 slidably mounted along frame member 22. Keepers 56 are engageable with a cutaway portion of brackets 38 to prevent downward movement of the bracket assembly and fifth wheel as explained in detail below.

Figure 13:
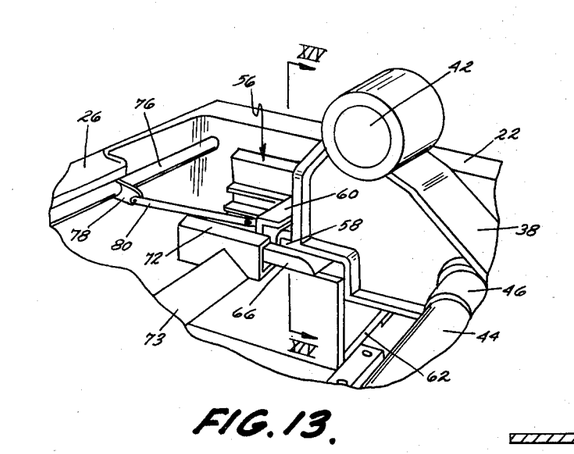
FIG. 13 is a perspective as viewed along the arrow XIII in FIG. 3 illustrating the lock mechanism for holding the fifth wheel in raised position.
Figure 14:
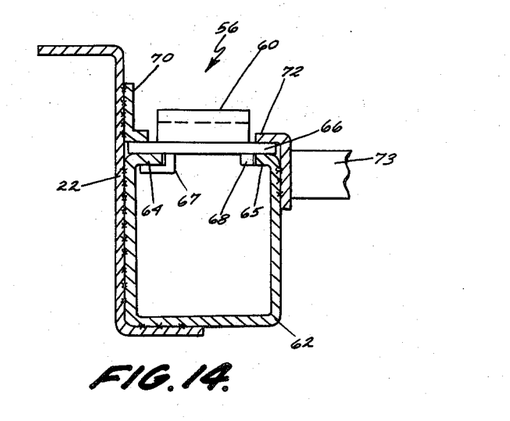
FIG. 14 is a cross-sectional view taken along the plane XIV—XIV of FIG. 13 illustrating the lock mechanism.
Figure 15:
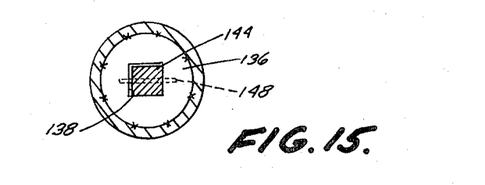
FIG. 15 is a cross-sectional view taken along the plane XV—XV in FIG. 5 illustrating the retractable handle assembly for rotating the drawbar into a storage position.

Referring specifically to FIGS. 13 and 14, a bracket member 38 on one side of the frame is shown. It will be understood that a similar mirror image locking arrangement is provided on the opposite side. Bracket 38 includes a rearwardly extending flange 58 (see also FIG. 5) which is engageable under a cooperating inverted L-shaped member 60 on the upper portion of keeper 56. This engagement prevents over-travel of the fifth wheel. Overtravel tends to occur when a fifth wheel is backed vigorously into a king pin, with the resulting impact tending to push the fifth wheel forwardly on its elevating supports. In FIG. 14, the mounting arrangement for the keepers is illustrated in cross section. A generally U-shaped slide guide member 62 is fixed as by welding to the inside of the Z shaped side channel frame member 22. At its upper open side, it includes a pair of inwardly turned flange members 64 and 65 upon which the keepers 56 are slidably mounted. The body 66 of the keeper 56 is elongated and carries locking flange 60 on its upper surface. On the lower surface of the body, a first guide flange 67 is provided which engages beneath flange 64 positioned adjacent frame member 22. A rail 68 on the lower surface of body 66 abuts the opposite flange 65 for sliding movement. The keepers therefore can slide fore and aft in guide means which retains them top and bottom.

An L-shaped bracket 70 welded to the inside of frame member 22 above bracket 62 further positions the keeper on one side of flange 67 while another flange 72 extending above flange 65 also assists in preventing lateral shifting of the shoe along guide member 62. Sliding movement of the locking keeper along guide member 62 into engagement with bracket 38 locks the fifth wheel in its raised position (FIG. 5). The sliding movement of the keepers is controlled by a manually operated handle 74 positioned at one side of the dolly frame near rear cross member 26. The handle is fixed to a rotatably mounted cross shaft 76. A pair of arm members 78 (FIGS. 3 and 13) fixed to and rotatable with the shaft, are connected by connecting rods 80 pivotally attached to the end of arm members 78 and to a mounting 82 at the rear of the keepers. The handle may be rotated to a downwardly facing position as shown in FIG. 2 causing the keepers to move back along channels 22 toward the rear of the dolly and pull the keepers out of supporting position with the fifth wheel so that the fifth wheel may be lowered. When the handle is rotated to a horizontal position, as shown in FIGS. 3 and 5, when the fifth wheel is raised, the keepers engage mounting bracket 38 and prevent its lowering. A spring loaded locking pin 84 is provided on the handle for engagement with corresponding openings 86 (FIGS. 2 and 5) provided in the side of frame members 22 to hold the handle and lock it and the keepers into position. Accordingly, a load placed on the fifth wheel is applied to the dolly frame through the keepers and slide members 62 which are secured to the dolly frame 22. A portion of the load on the fifth wheel is also carried by cross shaft 44.

The novel drawbar structure 18 is telescopically mounted and shiftable between extended and retracted positions. In FIGS. 1 through 4 the dolly is shown with the drawbar retracted and coupled in tandem axle fashion with the rear of a truck tractor 20. In tandem axle use, the fifth wheel 16 on the dolly is lowered and a trailer is connected to the fifth wheel 88 (FIG. 2) normally carried by the tractor. The tractor fifth wheel is mounted for fore and aft movement on the tractor framework in a conventional manner for axle load adjustment, as on a track 90 carried by the tractor frame members 92 (FIG. 3). In FIGS. 3 and 4, the fifth wheel 16 is shown in its elevated position for clarity although it will be understood that when in use in tandem axle connection with a tractor, it is lowered as shown in FIGS. 1 and 2 and the trailer is connected to the fifth wheel mounted on the tractor frame.

When the dolly is not in use, a jack or landing gear 94 can be extended downwardly to support the dolly. A folding landing gear handle 96 is provided at the rear of the dolly and is connected to operate the landing gear in a conventional manner.

Figure 6:
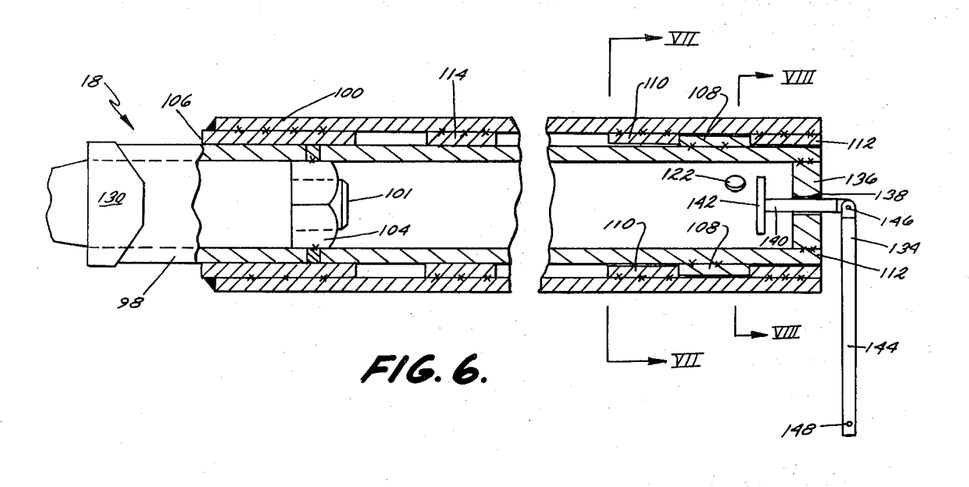
FIG. 6 is an enlarged cross-sectional view of the drawbar assembly as shown in FIG. 4.
Figure 7:
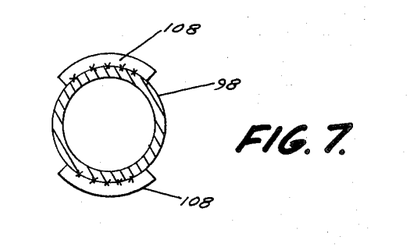
FIGS. 7 and 7a are cross-sectional views taken along the plane VII—VII of FIG. 6, showing the drawbar (FIG. 7) removed from the sleeve (FIG. 7a) to illustrate the mechanism for locking the drawbar in retracted position.
Figures 7A, 8:
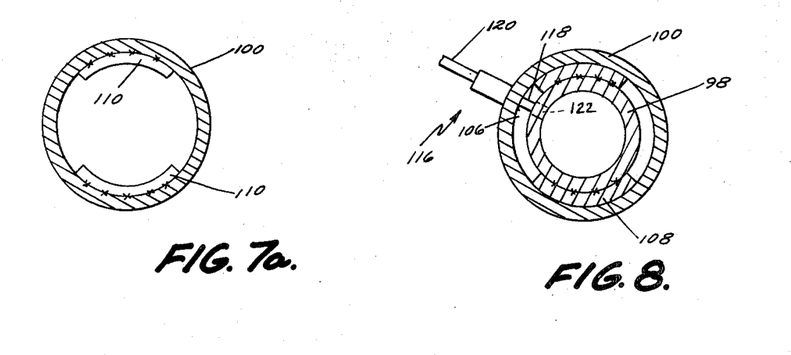
FIG. 8 is a cross-sectional view taken along the plane VIII—VIII of FIG. 6 illustrating the lock pin assembly for the drawbar.
Figure 9:
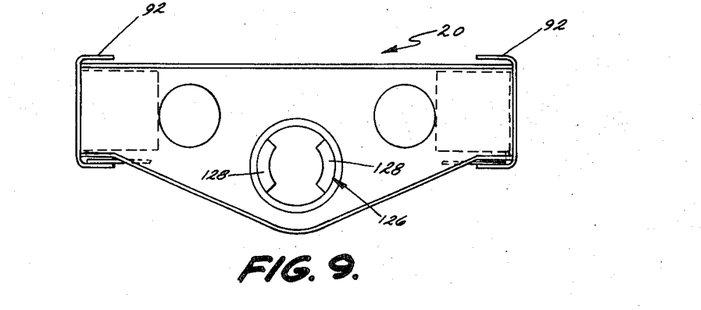
FIG. 9 is a plan view of the locking sleeve mounted on the tractor for receiving and securing the lunette end of the drawbar to the tractor when used in tandem axle fashion.

Referring additionally to FIGS. 6 through 8, the drawbar assembly includes an elongated shaft 98 which is a hollow, cylindrical structure adapted to fit within a sleeve 100. The sleeve is welded to and forms a part of the frame assembly and is fixed to the central part of the frame along its length and extends forwardly therefrom a slight distance.

The drawbar includes a lunette 102 fixed to its outermost end by means of a threaded stud 101 and bolt 104 which is welded inside the drawbar shaft. The shaft is supported for rotational and longitudinal movement within the sleeve. At the forward end of sleeve 100, an annular collar or bushing 106 is provided to support the shaft as it is moved between extended and retracted positions. The shaft may be locked in either of its positions by means of annular segments positioned about the inner diameter of the sleeve and cooperatively engageable annular segments fixed on the outer diameter of the shaft.

In the retracted position as shown in FIGS. 4 and 6, annular segments 108 welded on shaft 98 abut segments 110 fixed inside the sleeve 100 to prevent the drawbar from being extended. An annular collar 112 fixed in the rear end of sleeve 100 prevents the drawbar from being pushed entirely through the rear of the sleeve as it abuts spaced arcuate segments 108 around the periphery of drawbar shaft 98.

To extend the drawbar, shaft 98 is rotated 90° such that arcuate segments 108 are aligned with the spaces between arcuate segments 110 in sleeve 100. I.e. the lunette is rotated from a horizontal orientation to a vertical orientation. The arcuate spacing between segments 110 is slightly greater than the length of segments 108 (FIGS. 7 and 7a). Accordingly, the drawbar may be moved between its positions by such a rotation thereof. Similarly, spaced arcuate segments 114 are provided at the forward end of the sleeve to allow passage of segments 108 as the drawbar is moved into its fully extended position. When segments 108 abut the inner end of collar 106, as illustrated in FIG. 5, the drawbar is rotated back 90° so that the abutment of segments 108 with segments 114 inside the sleeve prevents retraction of the drawbar when used as a trailer towing dolly. Collar 106 also abuts segments 108 on the drawbar to prevent it from pulling out of the sleeve. The lunette is then rotated back to the functional horizontal orientation.

A lock pin assembly 116 (FIGS. 3 and 8) is provided to prevent rotation of the drawbar when in retracted position. Lock pin assembly 116 is welded to sleeve 100 and includes a spring-loaded, radially oriented lock pin 118 fixed at one end of a shaft 120, and extending through the sleeve. The lock pin is engageable with the retracted drawbar, by its extension into an opening 122 (FIGS. 6 and 8) formed in the drawbar. A handle 124 on the opposite end of shaft 120 extends through side channel frame member 22 so that it may be conveniently operated from the rear of the dolly.

Figure 11:
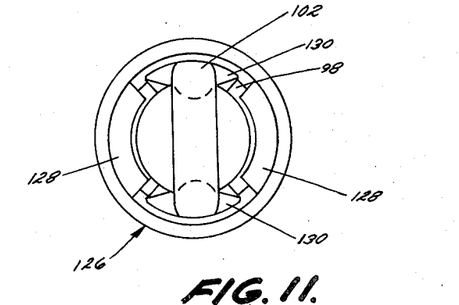
FIG. 11 is a view illustrating the lunette end of the drawbar as received in the locking sleeve in the tractor.
Figure 12:
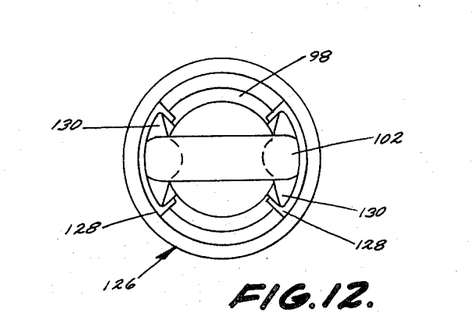
FIG. 12 is a view similar to FIG. 11 illustrating the drawbar rotated within the tractor sleeve into locked position.

When the drawbar is temporarily rotated 90° to be moved between retracted and extended positions, the lunette is positioned as shown in FIGS. 1, 10 and 11. In this position, the drawbar and sleeve 100 may be positioned inside a cooperable sleeve 126 fixed on the tractor frame. Arcuate segments 130 on the drawbar at the lunette end pass between segments 128 at the innermost end of sleeve 126. Drawbar 98 is then rotated 90° into the position shown in FIG. 12 so that segments 130 abut the inside of segments 128 and securely hold the drawbar assembly and sleeve 100 into engagement with sleeve 126 on the tractor to thereby form a tandem axle. When so coupled, lock pin assembly 116 engages the drawbar and prevents its rotation with respect to the dolly frame. It will be noted, however, that rotation between the tractor frame and dolly frame (and their respective axles) is allowed at the drawbar assembly connection with sleeve 126 to accommodate uneven road surfaces. This allows the dolly wheels to be elevated over bumps or the like in a road without lifting the drive wheels of the tractor from the pavement.

Once the dolly is locked to the tractor, air springs 32 are adjusted to equalize the weight on the dolly and tractor axles. Safety chains 132 are secured between the dolly and tractor, and the usual pneumatic and electrical connections are made. The dolly is then ready for use as a tandem axle with the tractor.

To uncouple the dolly, the electrical and pneumatic connections and safety chains are disconnected, the lock pin assembly is released by pulling handle 124, and the drawbar is rotated 90° to position segments 130 at the lunette end of the drawbar between segments 128 of sleeve 126 as shown in FIG. 11. The dolly may then be removed from the tractor.

The novel mechanism for rotating the drawbar between locked and unlocked positions with the tractor includes a slidably mounted handle assembly 134 provided at the rear end of drawbar shaft 98. A rear cover plate 136 (FIGS. 6 and 14) is welded at the end of drawbar shaft 98 and has an opening 138 generally in the center thereof through which the handle is passed. The handle is of two-piece construction, having an inner or tube-engaging end 140 to which a bushing or collar 142 is attached to prevent its removal from the drawbar tube, and an outwardly extending section 144 hinged to end 140 by pin 146. A roll pin 148 passed through the outer end of section 144 prevents its being pushed entirely through opening 138 into the drawbar when in storage position. To rotate the tube, the handle assembly is grasped at the roll pin end 148, pulled outwardly through opening 138 until collar 142 abuts the inner side of end plate 136. End 144 provides a lever or crank handle to rotate the drawbar shaft as handle end 140 engages the side walls of opening 138. When the drawbar is in retracted position, the handle assembly may be placed in storage position by pushing it into the drawbar until roll pin 148 abuts the end of plate 136. A cover 150 hinged to the rear cross member 26 covers the end of the drawbar assembly when the handle assembly is positioned in the drawbar. As shown in FIG. 5, handle assembly 134 is positioned inside the drawbar as it is moved between extended and retracted positions.

The features of the invention are described in connection with a convertible dolly where it finds its's preferred usage. It will be appreciated however, that the drawbar connection feature is applicable to the tandem axle construction sometimes called a "tag axle" assembly. The tag axle assembly is employed as a tandem axle on the truck tractor to enable redistribution of axle loading, but is not used alternately as a trailer dolly. The drawbar therefore has no reason to be extendible. On this tag axle assembly, the novel drawbar is rotatably connected to the novel sleeve on the tractor in the manner described herein. In such structures, the additional fifth wheel on the dolly will normally not be present either.

The unique coupling arrangement for connection of the dolly drawbar assembly to a tractor together with the unique retractable handle for rotating the drawbar provides a simple and convenient means by which the drawbar may be rotated to effect locking engagement of the dolly to a tractor without the necessity of the operator working between the dolly and tractor. The novel features of the fifth wheel locking and supporting keepers will also be appreciated since an extremely simple yet reliable connection is made between the elevated fifth wheel and the dolly framework.

Modifications and variations of the present invention will become apparent to those skilled in the art from a study of the foregoing disclosure. Accordingly, it is intended that the invention is not to be limited to the specific illustrative embodiment set forth herein.

The embodiments of the invention in which an exclusive property or privilege is claimed are defined as follows:

1. A dolly assembly for use with a tractor-trailer system, said dolly including a frame mounted on a wheeled axle assembly and a drawbar having one end extending forwardly of said frame transverse to said axle assembly, the improvement comprising:

locking means on said forwardly extending end of said drawbar adapted for engagement with cooperative locking means adapted for securement on a tractor, said locking means being rotatably engageable with said cooperative locking means;

means mounting said drawbar for rotation with respect to said frame, said mounting means including a sleeve member fixed to said frame, and means on said drawbar and in said sleeve member mounting said drawbar for rotation in said sleeve member; said locking means including arcuate segments extending outwardly from said drawbar adjacent said forwardly extending end, said cooperative locking means on said tractor including a second sleeve member adapted to telescopically receive said first-mentioned sleeve member and said drawbar; said second sleeve member having inwardly extending arcuate segments adapted for locking engagement with said outwardly extending arcuate segments on said drawbar; and means connected to said drawbar extending rearwardly of said frame for rotating said drawbar and said outwardly extending arcuate segments into locking engagement with said inwardly extending arcuate segments from the rear of said dolly.

2. The dolly assembly as defined in claim 1 wherein said drawbar has a lunette fixed at said forwardly extending end and further including means for converting said dolly for use as a trailer support and hauling dolly; said converting means including means telescopically mounting said drawbar in said first sleeve; and means on said first sleeve and said drawbar for locking said drawbar in either an extended or a retracted position, said dolly being adapted for use as a hauling dolly when said drawbar is locked in said extended position.

3. The dolly assembly as defined in claim 2 and further including a fifth wheel assembly mounted on said frame, said fifth wheel assembly being shiftable between raised and lowered positions, and fifth wheel locking means on said frame for holding said fifth wheel in said raised position when said dolly is used as a trailer support and hauling dolly.

4. The dolly as defined in claim 3 and further including means for shifting said fifth wheel assembly between raised and lowered positions, and means for shifting said fifth wheel locking means into locking position when said fifth wheel is raised.

5. The dolly as defined in claim 4 wherein said means for locking said drawbar between extended and retracted positions comprises second arcuate segments on said drawbar extending outwardly therefrom, and associated arcuate segments on an inner surface of said first mentioned sleeve member, said second segments and said associated segments aligned in a first angular position so as to engage one another thereby preventing movement of said drawbar, said segments being aligned in a second angular position to allow said drawbar to be freely moved in a longitudinal direction relative to said first sleeve whereby said drawbar may be shifted between extended and retracted positions.

6. A convertible dolly assembly for use in combination with a truck tractor in tandem axle fashion with the rear axle of the tractor, and convertible for use as a trailer support and hauling dolly comprising:

a frame having a wheeled axle assembly thereunder, and a fifth wheel assembly thereon;

a drawbar assembly having connection means thereon extending forwardly of said frame, said drawbar assembly being extendable for connection with the rear of a front trailer and being retractable for connection with the rear of a tractor;

position locking means for said drawbar assembly operable to lock said drawbar assembly in its extended position or in its retracted position;

receiving means on the tractor for said drawbar assembly, said receiving means and said drawbar assembly being telescopically interengageable;

securement means on said receiving means and said drawbar assembly, said securement means including spaced cooperative arcuate segments on said receiving means and on said drawbar, each of said segments spanning less than 90 angular degrees;

means mounting said drawbar assembly for rotation about its elongated axis; and means for rotating said drawbar assembly and said segments thereon into aligned abutting relation with said segments on said receiving means to secure said dolly to said tractor in tandem axle fashion, said drawbar assembly and said receiving means being arranged to allow rotational movement therebetween when connected in tandem axle fashion for accommodation of uneven terrain.

7. The combination as defined in claim 6 wherein said drawbar assembly includes a sleeve member fixed to said frame and a drawbar slidably mounted in said sleeve, said sleeve being telescopically interengageable with said receiving means on said tractor, said arcuate segments on said drawbar assembly being mounted at an extended end of said drawbar and cooperatively engageable with said arcuate segments on said receiving means; and means connected to said drawbar extending rearwardly of said frame for rotating said drawbar about its elongated axis to rotate said segments on said drawbar into aligned abutting position with said segments on said receiving means.

8. The combination as defined in claim 7 and further including radially extending stop means on said drawbar and in said sleeve member to limit extension of said drawbar with respect to said frame.

9. The combination as defined in claim 6 and further including fifth wheel positioning and support means between said frame and said fifth wheel, said positioning and support means operable to shift said fifth wheel between a lowered non-coupling position and a raised trailer coupling and towing position; said positioning and support means includes a pair of keeper members slidably mounted on said frame at opposite sides thereof, said keeper members being shiftable along said frame into position below said fifth wheel to support same in said raised position.

10. The combination in claim 9 including actuating means for said keeper means extending to the rear of said dolly.

11. A trailer support and hauling dolly convertible for tandem axle use between a truck tractor and a following trailer, and alternately usable between the rear of a front trailer and the front of a rear trailer, comprising:
- a dolly frame mounted on a wheeled axle assembly thereunder, and having a fifth wheel assembly thereon;
- a drawbar assembly extending forwardly of said frame and having connection means at its forwardly extending end, said drawbar assembly including a sleeve member fixed to said frame said drawbar being slidably mounted in said sleeve, said drawbar assembly being extendable with respect to said frame for connection with the rear of a front trailer and being retractable for connection with the rear of said truck tractor in tandem axle fashion with the rear axle of said tractor;
- position locking means for said drawbar assembly operable to lock it in its extended position or in its retracted position; said truck tractor including receiving means for said drawbar assembly, said sleeve being telescopically interengageable with said receiving means on said tractor;
- securement means operable to secure said drawbar assembly to said receiving means, said securement means including spaced cooperative arcuate segments on said receiving means and on said drawbar, said arcuate segments on said drawbar assembly being mounted at an extended end of said drawbar and cooperatively engageable with said arcuate segments on said receiving means; said securement means allowing rotational movement of said dolly frame about the axis of said drawbar assembly when said dolly is connected to the rear of said truck tractor; and
- means connected to said drawbar extending rearwardly of said frame for rotating said drawbar about its elongated axis to thereby rotate said segments on said drawbar into aligned abutting position with said segments in said receiving means.

12. The combination as defined in claim 11 and further including radially extending stop means on said drawbar and in said sleeve member to limit extension of said drawbar with respect to said frame.

13. The combination as defined in claim 11 and further including fifth wheel positioning and support means between said frame and said fifth wheel, said positioning and support means operable to shift said fifth wheel between a lowered noncoupling position and a raised trailer coupling and towing position; said positioning and support means includes a pair of keeper members slidably mounted on said frame at opposite sides thereof, said keeper members being shiftable along said frame into position below said fifth wheel to support same in said raised position.

14. The combination in claim 13 including actuating means for said keeper means extending to the rear of said dolly.

* * * * *